US010963692B1

(12) United States Patent
Corcoran et al.

(10) Patent No.: US 10,963,692 B1
(45) Date of Patent: Mar. 30, 2021

(54) DEEP LEARNING BASED DOCUMENT IMAGE EMBEDDINGS FOR LAYOUT CLASSIFICATION AND RETRIEVAL

(71) Applicant: Automation Anywhere Inc., San Jose, CA (US)

(72) Inventors: Thomas Corcoran, San Jose, CA (US); Vibhas Gejji, Fremont, CA (US); Stephen Van Lare, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 160 days.

(21) Appl. No.: 16/206,175

(22) Filed: Nov. 30, 2018

(51) Int. Cl.
*G06K 9/00* (2006.01)
*G06N 5/04* (2006.01)
*G06N 3/08* (2006.01)

(52) U.S. Cl.
CPC ..... *G06K 9/00463* (2013.01); *G06K 9/00456* (2013.01); *G06N 3/08* (2013.01); *G06N 5/046* (2013.01)

(58) Field of Classification Search
CPC ........... G06K 2209/01; G06K 9/00463; G06K 9/00483; G06K 9/00449; G06K 9/4604; G06K 9/6218; G06K 9/325; G06K 9/6267; G06K 9/00442; G06K 9/00469; G06K 9/36; G06K 9/3233; G06K 9/50; G06K 9/6221; G06K 9/628; G06K 9/00456; G06K 9/6256; G06F 40/106; G06F 16/93; G06F 16/355;
(Continued)

(56) References Cited

U.S. PATENT DOCUMENTS 10,489,682 B1 * 11/2019 Kumar ............ G06N 3/08
2002/0029232 A1 * 3/2002 Bobrow .......... G06K 9/00483
514/534
(Continued)

OTHER PUBLICATIONS

A density-based algorithm for discovering clusters in large spatial databases with noise, Ester, Martin; Kriegel, Hans-Peter; Sander, Jörg; Xu, Xiaowei, Simoudis, Evangelos; Han, Jiawei; Fayyad, Usama M., eds., Proceedings of the Second International Conference on Knowledge Discovery and Data Mining (KDD-96). AAAI Press. pp. 226-231 (1996).
(Continued)

*Primary Examiner* — Allahyar Kasraian
(74) *Attorney, Agent, or Firm* — Appleton Luff

(57) ABSTRACT

Image documents that have a visually perceptible geometric structure and a plurality of visually perceptible key-value pairs are grouped. The image documents are processed to generate a corresponding textually encoded document. The textually encoded documents are each assigned into one of a plurality of layout groups, wherein all textually encoded documents in a particular layout group share a visually perceptible layout that is substantially similar. Triplets are selected from the layout groups, where two documents are from the same layout group and one document is from a different layout group. The triplets are processed with a convolutional neural network to generate a trained neural network that may be used to classify documents in a production environment such that a template designed on one image document in a group permits an extraction engine to extract all relevant fields on all image documents within the group.

20 Claims, 15 Drawing Sheets

(58) Field of Classification Search
CPC ........ G06Q 10/00; G06Q 10/10; G06Q 30/04;
G06N 20/00; G06N 3/08; G06N 5/04
See application file for complete search history.

(56) References Cited

U.S. PATENT DOCUMENTS

| | | | | |
|---|---|---|---|---|
| 2006/0218110 | A1* | 9/2006 | Simske | G06N 20/00 |
| | | | | 706/45 |
| 2007/0030528 | A1* | 2/2007 | Quaeler | G06F 16/33 |
| | | | | 358/453 |
| 2018/0218429 | A1* | 8/2018 | Guo | G06N 3/0454 |
| 2019/0377987 | A1* | 12/2019 | Price | G06N 3/08 |
| 2020/0019767 | A1* | 1/2020 | Porter | G06K 9/00442 |
| 2020/0034976 | A1* | 1/2020 | Stone | G06T 7/246 |
| 2020/0097742 | A1* | 3/2020 | Ratnesh Kumar | G06N 3/0454 |
| 2020/0151591 | A1* | 5/2020 | Li | G06F 16/35 |
| 2020/0302208 | A1* | 9/2020 | Hoehne | G06N 20/00 |

OTHER PUBLICATIONS

Deep Residual Learning for Image Recognition, by K. He, X. Zhang, S. Ren, and J. Sun, arXiv:1512.03385 (2015).
FaceNet: A Unified Embedding for Face Recognition and Clustering, by F. Schroff, D. Kalenichenko, J. Philbin, arXiv:1503.03832 (2015).

* cited by examiner

Invoice —201                                    212            AUTOMATION ANYWHERE From                          203          For              204
Automation Anywhere                         ABC Corp
info@automationanywhere.com                 123
633 River Oaks                              Fake St
San Jose                                    90000
95145                                       Phone: 555 123 5487
Phone: 1-888-484-3535

202
Number  INV0001 ⌐ 205
Date    Nov 7, 2018
Terms   Due On Receipt ← 206            211

| Description | Price | Qty | Amount |
|---|---|---|---|
| Widget part no: 123584  ←209 | $33.00 | 12 | $396.00 |
| Gadget part no: 516515 | $12.80 | 15 | $192.00 |
|  | 210 → Subtotal |  | $588.00 |
|  | Tax (8%) |  | $47.04 |
|  | 214 → Total |  | $635.04 |
|  | Balance Due |  | $635.04 |
|  | 208 |  |  |

Notes
Thank you!

Invoice ← 201

212

AUTOMATION ANYWHERE

From 203
Automation Anywhere
info@automationanywhere.com
633 River Oaks
San Jose
95145
Phone: 1-888-484-3535

For 204
Company XYZ Inc.
800
Evergreen Rd
73636
Phone: 1 800 000 0000

202
205
Number  INV0002
Date    Nov 5, 2018
Terms   30 Days
Due     Dec 5, 2018 ← 206

211

| Description | Price | Qty | Amount |
|---|---|---|---|
| Part<br>part no: 554584 | $80.00 | 1 | $80.00 |
| Gadget ← 209<br>part no: 516515 | $12.80 | 78 | $998.40 |
| Gizmo<br>part no: 14694685 | $700.00 210 | 2 | $1,400.00 |
|  | Subtotal | | $2,478.40 |
|  | Tax (8%) | | $198.27 |
| 214 → | Total | | $2,676.67 |
|  | Balance Due | | $2,676.67 |

208

Notes
Thank you!

Invoice

The Green Thumb
Gardening and Landscaping Solutions

Date: 2018-09-07
Invoice No.: INV893292

PO No.: 4213
Contract No.: 1347525

799 S High St,
Columbus, OH 43206, USA
Phone: 614-444-5122
billing@thegreenthumb.com Order No.: 428681
Billing: Debit card or Credit card receipt
Due Date: 2018-10-07

Sales Person: Zoe R.
Terms of Payment: Due upon receipt

Bill To:
ZMReeds cleaning services
Zoe Reed
5761 Tim Tam Rd
Indianapolis, IN 46237
United States Customer ID: 7321
Tax ID: 741-57-6894

Ship To:
ZMReeds cleaning services
Zoe Reed
5761 Tim Tam Rd
Indianapolis, IN 46237
United States
Reed@clean.com
317-200-1234

| Qty | Item No. | Description | Unit Price | Total |
|---|---|---|---|---|
| 1 | | | | |
| 1 | | | | |
| | | | Subtotal | |
| | | | Taxes | |
| | | | Total | |

Make all checks payable to The Green Thumb Gardening and Landscaping Solutions.
Thank you for your business.

FIG. 4A

Invoice 201

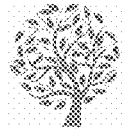

The Green Thumb
Gardening and Landscaping Solutions

Date: 2018-02-14 ← 205
Invoice No.: 584411 ← 202

799 S High St,
Columbus, OH 43206, USA ← 203
Phone: 614-444-5122
billing@thegreenthumb.com PO No.: 598813
Contract No. 265578-CO Order No.: 99861 ← 402
Billing: Credit
Due Date: 20/27/2018 ← 216

Sales Person: Bill F.
Terms of Payment: Prepaid ← 206

Bill To: ← 204
American Candle Co
Daniel Peters
7823 Jennings Ave
Flint, MI 48503
United States ← 406
Customer ID: 46211
Tax ID: 245-85-3277

Ship To: ← 404
American Candle Co
Daniel Peters
7823 Jennings Ave
Flint, MI 48503
United States
americancandleco@gmail.com
562-555-8764 ← 211

| Qty | Item No. | Description | Unit Price | Total |
|---|---|---|---|---|
| 1 | 891-08 | Winter Fire 10-3/4 x 6-3/4 in. Stake 2 Pack | $19.9 | $19.9 |
| 1 | 2037-449 | TubCleanin Revolutionary Tub Drain Protector Hair Catcher | $22.9 | $22.9 |
| | | 210 → Subtotal | | $221.99 |
| | | Taxes | | $22.20 |
| | | Total | | $244.19 |

214
420

408 →
Make all checks payable to The Green Thumb Gardening and Landscaping Solutions.
Thank you for your business.

FIG. 4B

| | | |
|---|---|---|
| Equisol Systems 203 | Date: | 2018-02-07 205 |
| 93 Mill Rd | Invoice No.: | 57467475 202 |
| Papaikou, HI 96781, USA | | |
| support@equisol.com | PO No.: | 4455-5746 |
| 648-073-9252 | Contract No. | 484775 |
| | Order No.: | 46387 |

Sales Person: 43  502    Billing: Cash         Terms of Payment: Net 14   206

Bill To                                    Ship To

204                                            Hank Classic   404
                                               Hank Williams
Hank Classic                                   2729 Kelly Street
Hank Williams
2729 Kelly Street          211                 Charlotte, NC 28202
Charlotte, NC 28202                            United States
United States                                  hank@hankclassic.com
                                               555-485-5647

| QTY | Item Number | Description | Unit Price | Total |
|---|---|---|---|---|
| 1 | 6598153 | Ugg women bailey bow boot. Sheepskin lined classic boot with decorative bows. Mid calf boots. Shoe width medium in color tan. | $69.99 | $69.99 |
| 1 | 56184701 | Nike women revolution 4 running shoe. Wide knit mesh upper with Synthetic overlap with laceup closure. Padded tongue and collar. Molded foam insole. Color is purple platinum. | $75.81 | $75.81 |

209

SubtDue Date: 2018-08-02$145.80  216
                                         210   Taxes              $14.58
                                    214        Total              $160.38

Equisol Systems 203
93 Mill Rd
Papaikou, HI 96781, USA
support@equisol.com
648-073-9252

Date: 2017-12-08 — 205
Invoice No.: 41689 — 202
PO No.: 93643
Contract No.: 4342-2891
Order No.: 8975641

Sales Person: Elliot O. 502    Billing: Bank Transfer    Terms of Payment: Due upon receipt — 206

Bill To

204

Davido Investment Company
FAVOUR DAVIS
21 Opulent Street
Dallas, TX 89756
United States

Ship To

Davido Investment Company 404
FAVOUR DAVIS
21 Opulent Street

Dallas, TX 89756
United States
Invest@Davis.org
-4352

211

| QTY | Item Number | Description | Unit Price | Total |
|---|---|---|---|---|
| 1 | 23-8897 | Givenchy Silver Women's Bracelet | $58.00 | $58.00 |
| 1 | 87-4984 | Women's Sapphire Pendant Necklace | $100.00 | $100.00 |
| 1 | 38389 | Kate Spade Bangle Bracelet | $48.00 | $48.00 |
|  |  |  | Subtotal | $206.00 |
|  |  |  | Taxes | $20.60 |
|  |  |  | Total | $226.60 |

209    210    214

Due Date: 2018-11-09

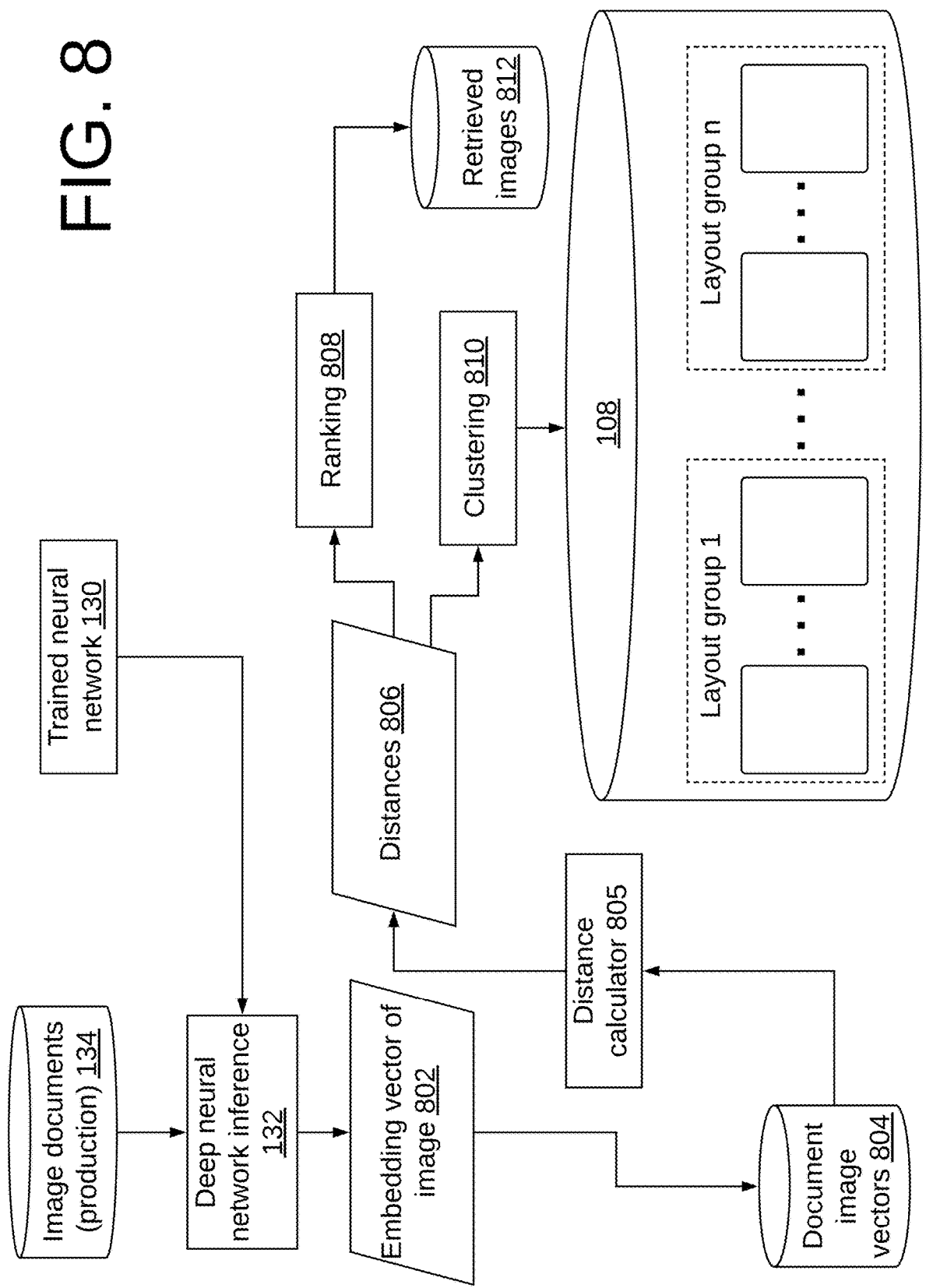

US 10,963,692 B1

DEEP LEARNING BASED DOCUMENT IMAGE EMBEDDINGS FOR LAYOUT CLASSIFICATION AND RETRIEVAL

FIELD OF THE DISCLOSURE

This disclosure relates generally to the field of data processing systems and more particularly to detection and retrieval of information from digitized documents.

BACKGROUND

Accurate identification and extraction of data from business documents is an important aspect of computerized processing of business documents. Some business documents are exchanged in an electronic format that permits automatic, or semi-automatic importation of required information into a computer program for processing. A large volume of business documents however are exchanged in an image format, such as paper, or an electronic representation of an image format, such in Portable Document Format (PDF), or other image formats (TIFF, JPEG, etc.). Typically, such business documents are structured in some way to facilitate at least visual recognition of pertinent fields in the document. Automating the processing of such documents is challenging due to the variability in formatting and image quality in such documents. Typically, for a particular type of document, such as an invoice, expense report or purchase order, there will be variability in the specific information contained. While any particular type of business document will have a number of fields that are necessary, and commonly found, such fields will be formatted differently among different documents and will be positioned differently on the document. Moreover, even if two documents have the same fields, in the same format, there may be visually perceptible differences (such as from scanning artifacts and different image resolutions) that can prove challenging to automated scanning and recognition systems. Accordingly, there is a need for improved computerized systems and methods for automating the recognition of business documents that are exchanged in an image format.

SUMMARY

A computerized method and system for generating groupings of documents that are in image format, where the image format has a visually perceptible geometric structure is disclosed herein. The image documents additionally have a plurality of visually perceptible key-value pairs. The image documents are processed to generate, for each of the image documents, a corresponding textually encoded document wherein visual representations of text in an image document are converted to a textual encoding in the corresponding textually encoded document. Each of the textually encoded documents is assigned to one of a plurality of layout groups, wherein all textually encoded documents in a particular layout group share substantially similar: visually perceptible layouts, visually perceptible key-value pairs, where a key in each key-value pair identifies a value associated with that key-value pair, and visually perceptible table structures. Each image document is assigned to a layout group assigned to the corresponding textually encoded document. A plurality of triplets is formed by selecting two image documents from a first layout group and a third image document from a second layout group. Documents in each triplet are processed with a convolutional neural network to generate an n-dimensional embedding for each image document in the triplet, wherein the n-dimensional embedding represents a compressed representation of the image document, and wherein two identical image documents have the same n-dimensional embedding. Each image document in each triplet is also processed with a contrastive loss module to identify differences between the image documents in the triplet. The processing by the convolutional neural network and the contrastive loss function is repeated a number of times to generate a trained network, which may be employed to process a production set of image documents to generate groupings of the production set of image document, such that a template designed on one image document in a group permits an extraction engine to extract all relevant fields on all image documents within the group.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2A shows an example of a typical domain document (English-language invoice) converted to a monochrome image.

FIG. 2B shows an example of a variant of the invoice in FIG. 2A, that is in the same, first layout group of the invoice of FIG. 2A.

FIGS. 4A and 4B show examples of two additional invoices that are variants of each other and are in a third layout group.

FIGS. 6A and 6B show examples of two additional invoices that are variants of each other and are in a fifth layout group.

FIG. 8 is a block diagram of illustrating further details of production image processing employing the trained neural network 130 of FIG. 1.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Converting a document image into structured data may be performed in a process comprising three major steps: (i) group documents uploaded by user(s) into groups based on the layout structure of the documents, (ii) manually design an extraction template for each unique layout, (iii) employ an extraction engine that uses the template for each layout to convert the document text into a structured format. Disclosed herein are methods and systems to perform the first step described above, namely to group documents with similar layout together, such that a template designed on one document in each group would allow an extraction engine to extract all relevant fields on all documents with each group. The documents of interest here are documents with some structure, and specifically, documents that have a similar geometric structure that permit them to be grouped together.

The document similarity metric disclosed herein is a based on the Euclidian distance between learned embeddings from two document images. Advantageously, the disclosed system and method uses only the document image features, rather than any text-based features. This allows for faster sorting without the need to run expensive OCR operations. Furthermore, it avoids the need for preprocessing or other image degradation avoidance mechanisms as the Convolutional Neural Network (CNN) that is employed is trained on noisy images. The system works by comparing three images to each other: an anchor image, an image similar to the anchor image and an image dissimilar to the anchor image. The system then tries to minimize the l2 distance between the representations of the similar images by adjusting the representations themselves, while at the same time maximizing the l2 distance between the two dissimilar images. This is achieved through a triplet loss and backpropagation through a CNN to adjust the image representations. The system and method is comprised of two major phases: a training phase where the embeddings are learned from images, and an inference phase where the learned embeddings can be used for classification and retrieval.

Figure 1:
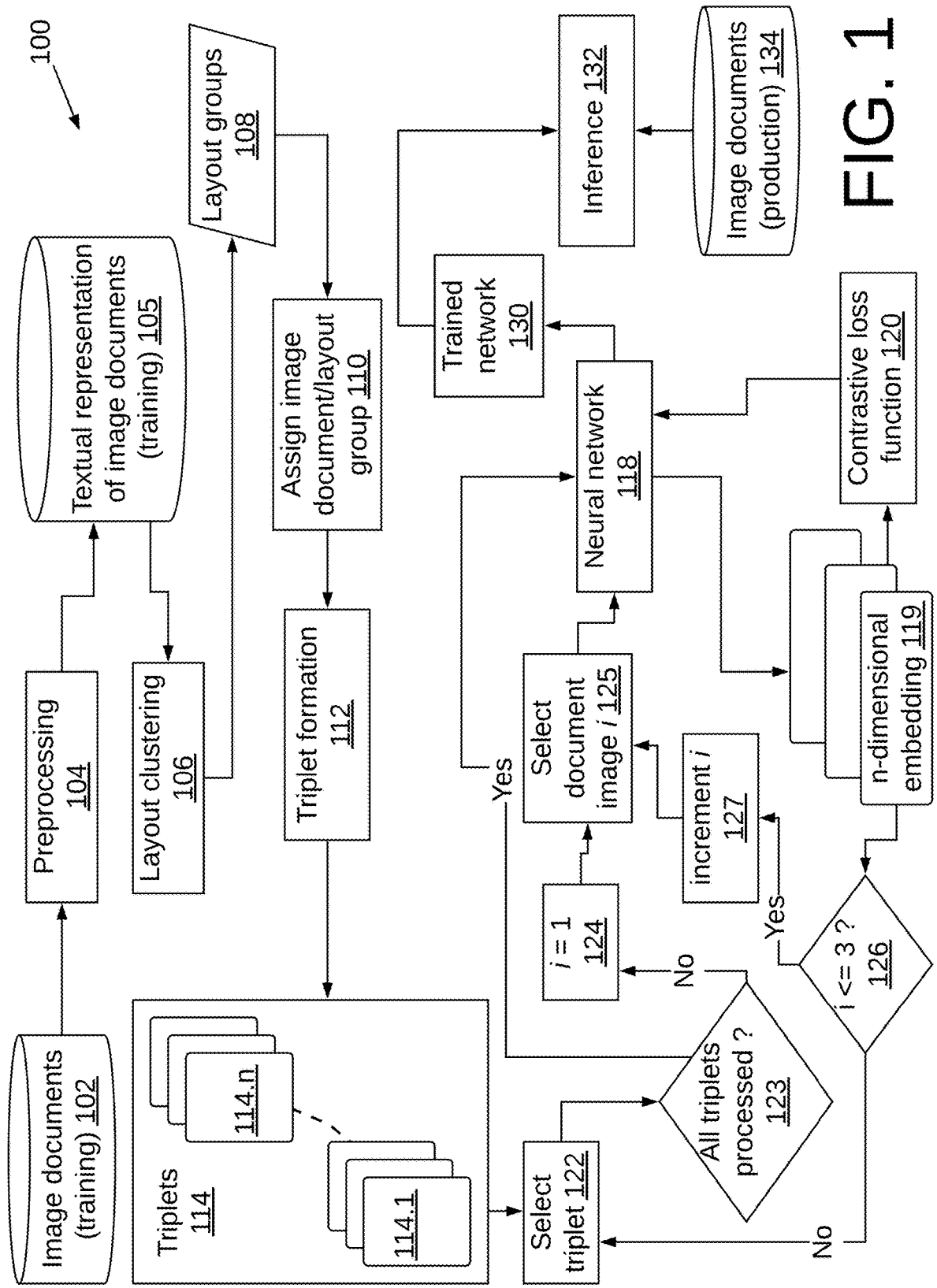
FIG. 1 is a high-level block diagram of an embodiment of a system for performing document image embeddings for layout classification and retrieval.

FIG. 1 is a high-level block diagram of an embodiment of a system 100 for performing document image embeddings for layout classification and retrieval. A corpus of image documents 102 used for training may include a variety of different types of business documents, stored in at least an image format, such as PDF, JPEG, TIFF, where there are multiple instances of each type of business document. The business documents will typically be of a document type that is processed regularly by an organization, such as an invoice, purchase order, job application and travel expense report. Other business documents may be more specific to an organization's business. For example, a financial institution may use a loan application form, or a healthcare organization may use a patient intake form.

An example of a typical domain document (English-language invoice) converted to a monochrome image, and an example of a specific instance of an image document may be seen in FIG. 2A. As seen, invoice 200, which may be one of the document images 102, has a number of labels and associated data fields that are necessary for an invoice. The invoice is labeled as an "invoice" at 201. There is an invoice number 202 that uniquely identifies the invoice. The invoicing entity and address, seen at 203, identify the entity issuing the invoice. The recipient of the invoice is shown at 204, where the identity of the recipient, street address and phone number can be seen. In addition, the invoice has a date field 205, payment terms 206, and a balance due 208. An itemized listing of the items supplied by the invoicing entity is shown at 209, with associated amounts for price, quantity, and total amount for the item. Subtotal amount and tax are shown at 210 and total is shown at 214. A logo of the issuing entity is seen at 212. The invoice 200 can also be seen to be formatted with text of different sizes and with varying font characteristics such as the use of bold font in certain places such as for "Balance Due" at 208 for the label "Balance Due" and the associated amount "$635.04". As will be appreciated by those skilled in the art, alternative representations may also be found in other invoices. Different sizes of fonts are also used, such as for Invoice field 201 which is in a larger font than other fields. Also, a table header bar is seen at 211 with text in reverse color (white on black) contained therein. The present specification provides an example of an invoice as a business document containing visually perceptible geometric structure. The principles described herein also apply to other types of business documents where the documents of a particular type (such as a purchase order, job application, expense report, loan application, medical record) have a similar geometric structure.

FIG. 2B shows an invoice 220 that is of highly similar structure to invoice 200 but that varies a bit from invoice 200 in the key-value pairs that are present. Invoice 220 has the same table structure as invoice 200 in that the From and For fields 203 and 204 are in the same position, as are fields 202, 205, 206, as is table header bar 211 as well as descriptions 209 that contain details as to the items that are the subject invoice, as well as the price, quantity and amounts for the listed items. The Tax 210, Total 211 and Balance Due 208 fields are also the same. Invoice 220 however has a Due field 216 not seen in invoice 200. Moreover, there is an additional item listed at 209 in 220 that is not seen in invoice 200. Because invoices 200 and 220 share the same visually perceptible layout, the same visually perceptible table structure, and substantially the same key fields, they fall into the same layout group, as explained further herein.

Figure 3A:
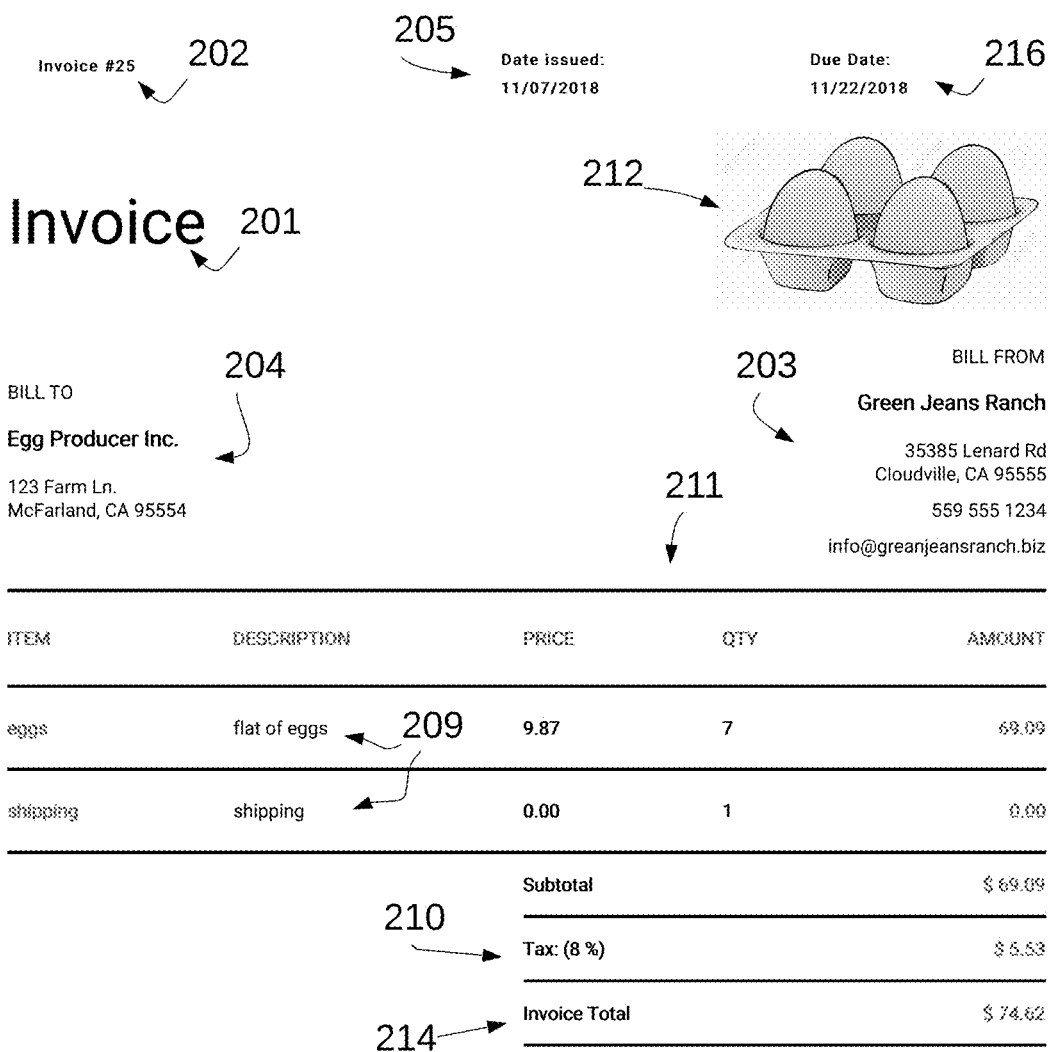
FIGS. 3A and 3B show examples of two additional invoices that are variants of each other and are in a second layout group.
Figure 3B:
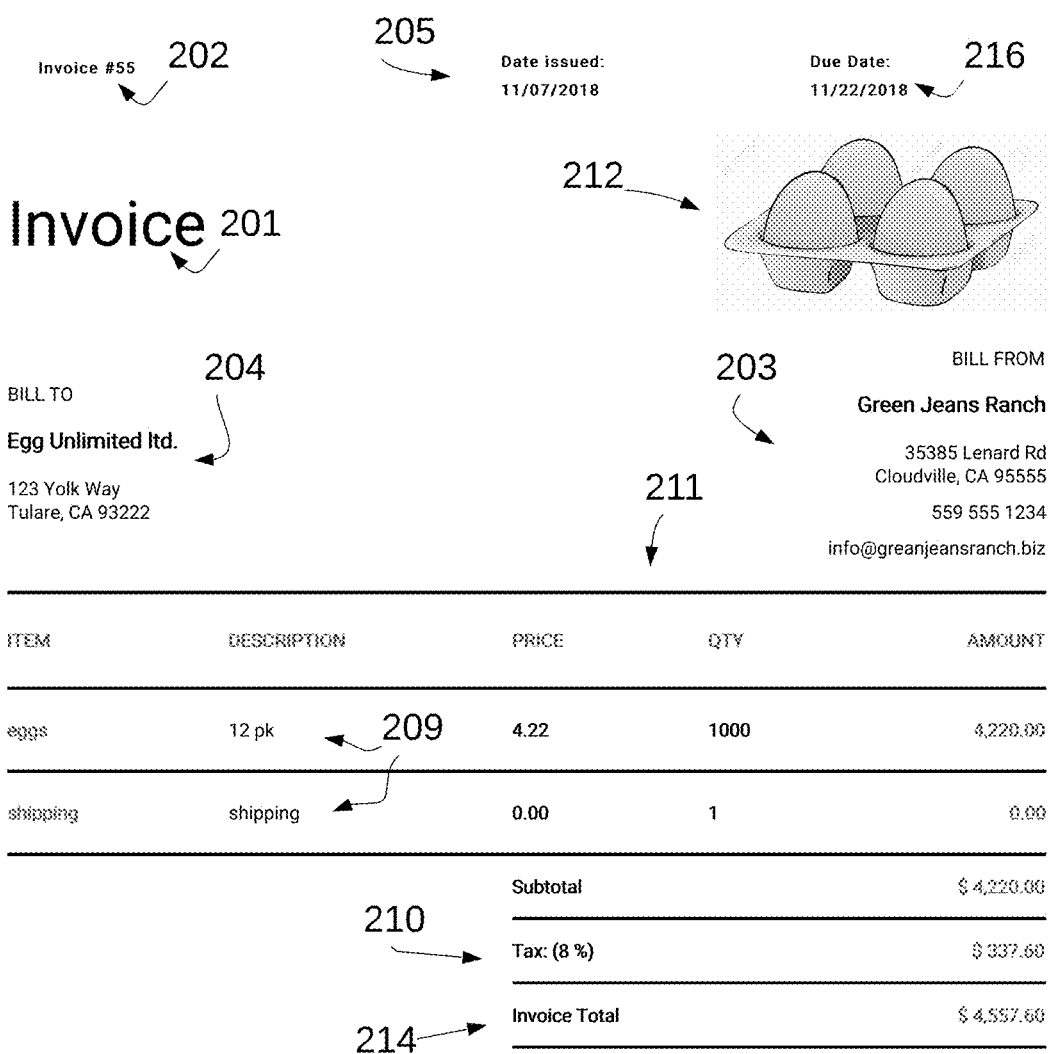

FIGS. 3A and 3B illustrate invoices 300 and 320 that are of highly similar structure but that vary a bit from each other. The invoices 300 and 320 have a visually perceptible layout and visually perceptible table structure that is substantially different from invoices 200 and 220 and therefore are in a different layout group, despite having substantially similar key fields (such as e.g., 201, 202, 203, 204, 205, 216, 211, 209, 210, 211). Invoice 320 is slightly different from invoice 300 in the description of the item egg at 209, where invoice 200 denotes the item as "flat of eggs" while invoice 220 denotes the item in different terms as a "12pk".

FIGS. 4A and 4B illustrate invoices 400 and 420 that are of highly similar structure but that vary a bit from each other. The invoices 400 and 420 have a visually perceptible layout and visually perceptible table structure that is substantially different from invoices 200 and 220, and 300 and 320 and are therefore in a different layout group, despite having substantially similar key fields. Invoice 420 is slightly different from invoice 400 in that key "Terms of Payment"

seen at 206 is further indented to the right in 400 than in 420, which results in the value for the field 206 ("Due upon receipt") in invoice 400 spilling over into the next line. Also, the formatting of the date value in for the Due Date key field at 216 is different between the two invoices.

Figure 5A:
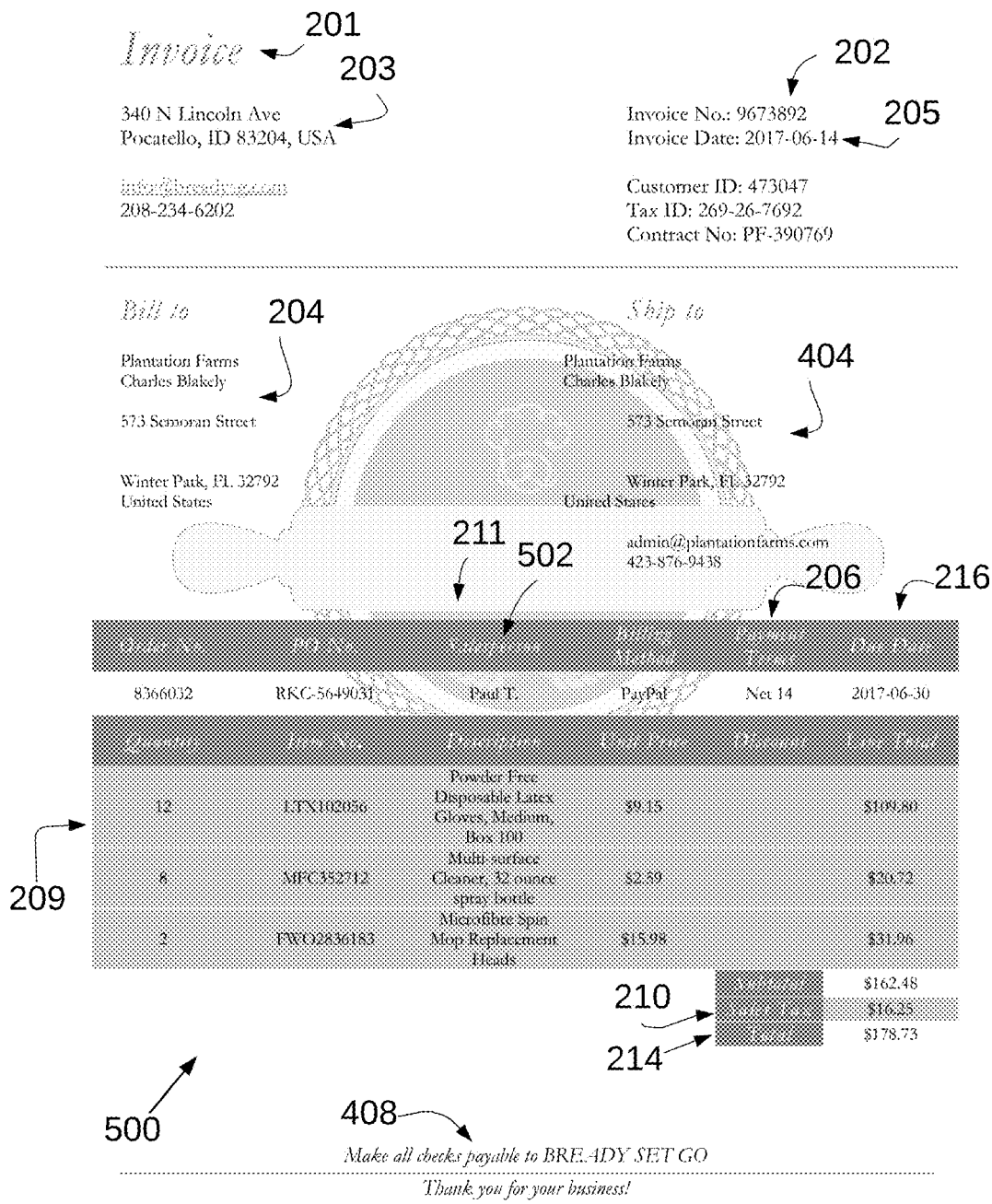
FIGS. 5A and 5B show examples of two additional invoices that are variants of each other and are in a fourth layout group.
Figure 5B:
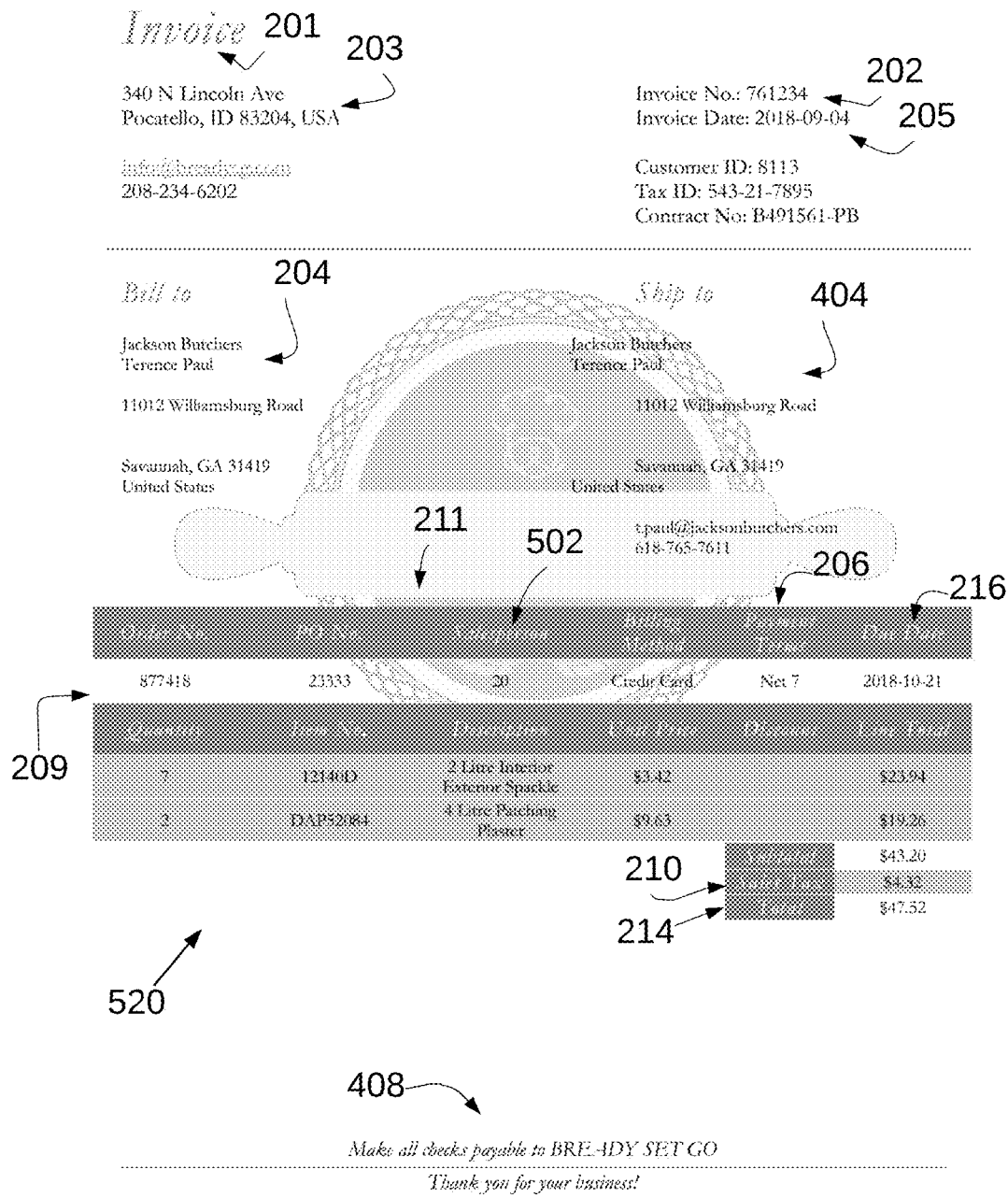

FIGS. 5A and 5B illustrate invoices 500 and 520 that are of highly similar structure but that vary a bit from each other. The invoices 500 and 520 have a visually perceptible layout and visually perceptible table structure that is substantially different from invoices 200 and 220, 300 and 320, and 400 and 420, and therefore are in a different layout group, despite having substantially similar key fields. Invoice 520 is slightly different from invoice 500 in that key the value for the key field 502 ("Salesperson") takes a different form. In invoice 500 the value for the key field 502 takes the form of first name and last initial ("Paul T.") whereas in invoice 520 the value for the same key field 502 is in the form of an integer ("20").

FIGS. 6A and 6B illustrate invoices 600 and 620 that are of highly similar structure but that vary a bit from each other. The invoices 600 and 620 have a visually perceptible layout and visually perceptible table structure that is substantially different from invoices 200 and 220, 300 and 320, 400 and 420, and 500 and 520 and therefore are in a different layout group, despite having substantially similar key fields. Invoice 620 is slightly different from invoice 600 in that the key value for the key field 206 is different but also the second line of the value in invoice 620 is partially cut off due to a formatting error, a printing error or a scanning error. Moreover, the value for the key field seen at 502 ("Sales person") takes the form of an integer in invoice 600 and of a first name, last initial in invoice 620. Moreover, key field "Due Date" seen at 216 overlies the Subtotal field in invoice 600, due possibly to a formatting error, while in invoice 620, the field 216 slightly overlaps the bottom edge of the table 211, also perhaps due to a formatting error.

As can be seen from the above few examples, there can be a wide variety in formatting in even a single document type such as in invoice. Moreover, while two documents may have the same format and table structure, there can be differences in formatting of the values, along with printing errors, scanning errors or errors in the formatting of the original documents. The embodiments disclosed herein provide an improved solution to automated recognition of document types and categorization of similarly structured documents to facilitate automated recognition, and thereby extraction, of key-value pairs in such documents.

Turning back to FIG. 1, preprocessing 104 performs Optical Character Recognition (OCR) to convert text represented visually in a document image 102 into a textually encoded representation 105 of the image document 102, where visually perceptible text in the image document 102 is converted to a textually encoded representation. Preprocessing 104 may also include different computer vision approaches to clean up the document, such as speckle noise removal, orientation and skew correction, contrast enhancement, binarization, and background removal. Layout clustering 106 is then performed on the image documents 102 to assign each of the textually encoded documents 105, into one of a plurality of layout groups 108. All textually encoded documents in a particular layout group 108 share a visually perceptible layout that is substantially similar, and a substantially similar set of visually perceptible key-value pairs where a key in each key-value pair identifies a value associated with that key-value pair. Each textually encoded document 105 in a layout group has a visually perceptible table structure that is substantially the same as each other document 105 in the layout group, such as seen in the layout group shown in FIG. 2A and 2B, the layout group shown in FIG. 3A and 3B, the layout group shown in FIG. 4A and 4B, the layout group shown in FIG. 5A and 5B, and the layout group shown in FIG. 6A and 6B. In one embodiment, assignment at 106 of each textually encoded document 105 into a layout group 108, collectively (individually designated 108.1, 108.2, . . . , 108.n) may be performed using locally connected subgraph isomorphism and Density-Based Spatial Clustering of Applications with Noise (DBSCAN), as described by Ester, Martin; Kriegel, Hans-Peter; Sander, Jörg; Xu, Xiaowei; Simoudis, Evangelos; Han, Jiawei; Fayyad, Usama M., eds., "A density-based algorithm for discovering clusters in large spatial databases with noise", Proceedings of the Second International Conference on Knowledge Discovery and Data Mining (KDD-96), AAAI Press. pp. 226-231.

Figure 7A:
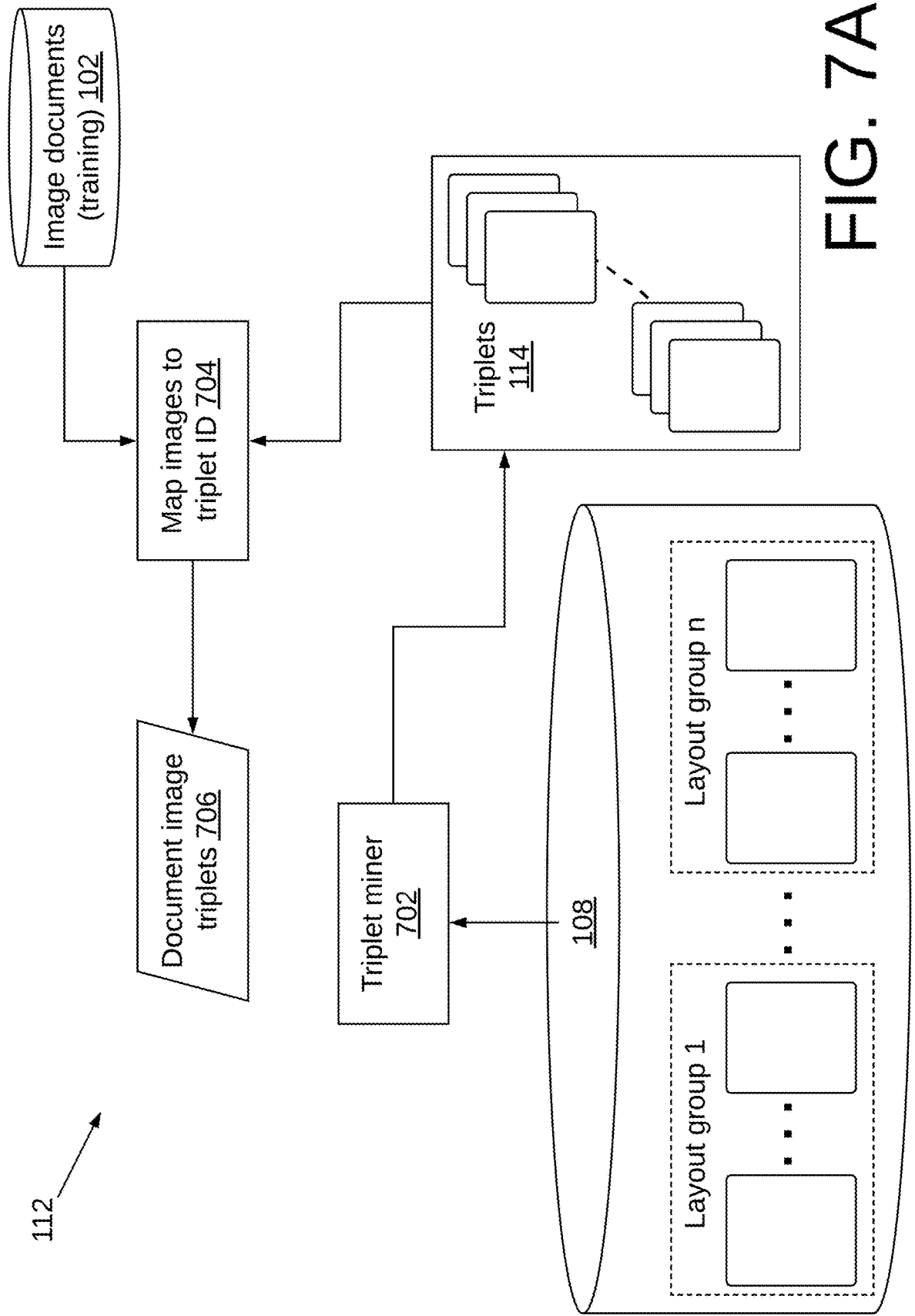
FIG. 7A is a block diagram of illustrating further details of triplet formation 112 of FIG. 1.

Once each textually encoded document 105 has been assigned at 106 to a layout group 108, each image document 102 is assigned at 110 to the layout group 108 of the corresponding textually encoded document. Triplet formation is then performed at 112 by selecting two image documents 102 from a first layout group 108 and a third image document 102 from a second layout group 108 to form a triplet 114. Details of triplet formation may be seen in FIG. 7A. Triplet miner 702 retrieves a first document image 102 from a layout group 108, a second document image 102 from the same layout group 108, and a third document image 102 from a second layout group 108. A triplet ID is created at 704 to map a document image identifier (DII), that identifies each document image selected by triplet miner 702, to a triplet identification (TID). Each TID is stored to a database 706 of document image triplets.

Forming triplets by triplet miner 702 requires a definition that provides parameters to define when two images 102 are similar or dissimilar. For one embodiment disclosed herein, similar images are those that maintain roughly the same structural layout. That is, the relations to all keys and values within a document are consistent across all documents in a layout, and likewise the table structure is the same within all documents of a particular layout. In such an embodiment, it is assumed that all images within a particular layout group 108 have an L2 distance (where L2 is the Euclidean distance between two vectors) of 0—that is they are the exact same for layout grouping and retrieval purposes. It is also assumed that all layout groups 108 have a maximal normalized L2 distance, i.e. layout groups are all equally spaced from each other.

Figure 7B:
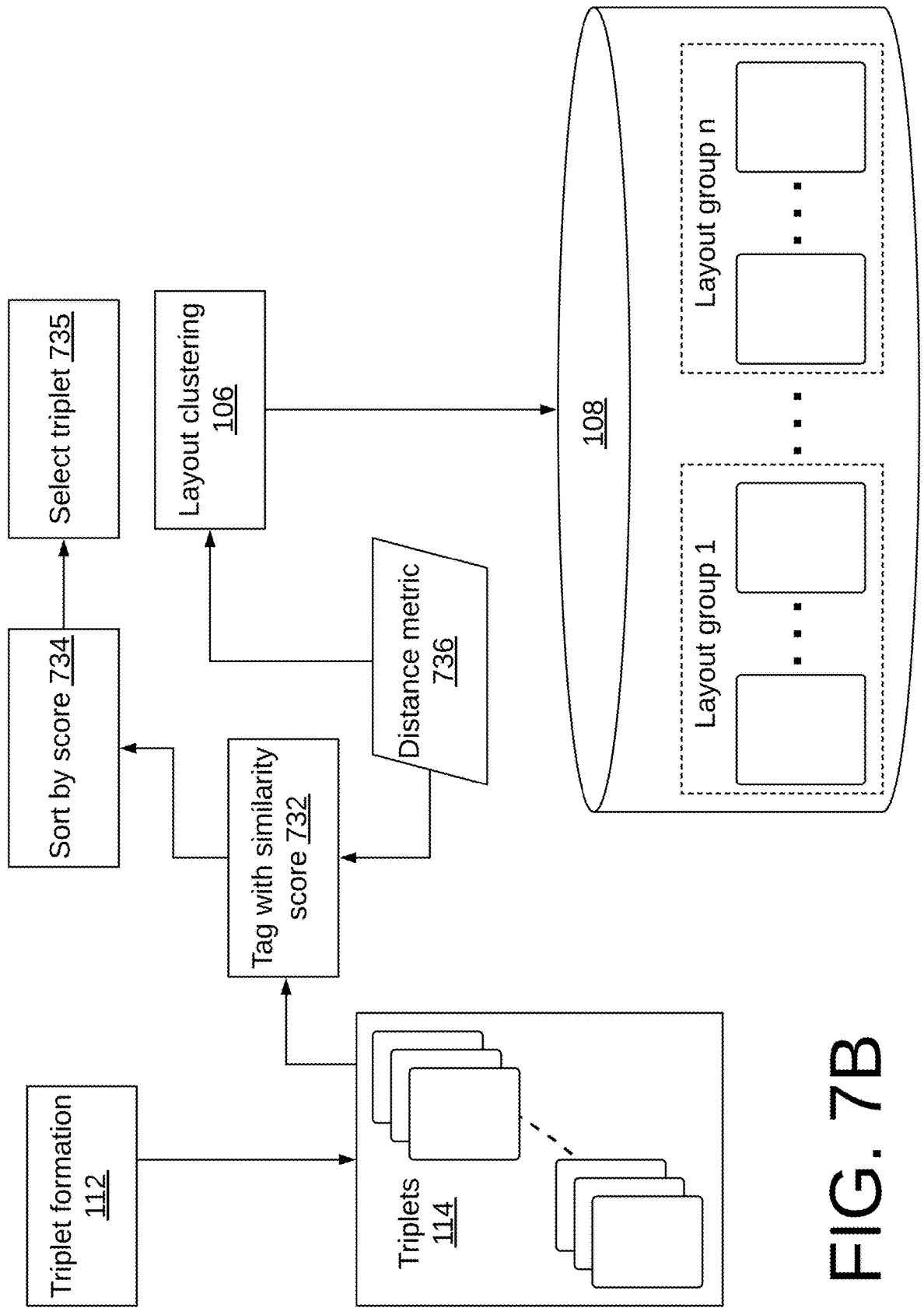
FIG. 7B is a block diagram of an alternative embodiment of determining similarity of structural layout of documents.

In another embodiment implemented by triplet miner 702, the relations between all keys and values within a document may be substantially the same across all documents in a layout, as defined by an adjustable key-value similarity threshold value. In another embodiment, the similarity of the structural layout of documents in a layout group may be defined by the value calculated by the layout clustering engine 106 as a result of whatever structural similarity metric was employed. In this embodiment, seen in FIG. 7B, it is assumed that the distance metric calculated from the clustering method is continuous, but that the distances between documents in different layout groups is always greater than the distance between any documents within the same layout group. Triplet formation 112 is then responsible for tagging 732 each triplet with a hardness score according to the similarity of the anchor image and the negative example. The similarity metric used in 106 can be employed here to perform layout clustering on the image documents 102 to assign each of the textually encoded documents 105, into one of a plurality of layout groups 108. Hard examples are those that have very similar structural scores but still fall into different groups. The intuition is that more subtle changes in layout are harder for the CNN to learn. The triplets are sorted 734 by their hardness score, selecting, 735, less hard examples when training is starting and increasing the hardness of examples as training progresses. This permits an approach to training where a training routine that gradually increases in difficulty is selected as the system learns more nuanced embeddings of documents.

Turning back to FIG. 1, training of the neural network can be seen where a deep convolutional neural network (CNN) 118 is constructed such that the final layer of the CNN 118 produces an n-dimensional array that contains the representation of the image 102 on the forward pass of the network 118. In one embodiment, the neural network 118 may take a form of the ResNet 50 CNN, aspects of which are described in "Deep Residual Learning for Image Recognition," by K. He, X. Zhang, S. Ren, and J. Sun, arXiv: 1512.03385 (2015). The ResNet 50 CNN advantageously addresses the susceptibility of deep neural networks to vanishing gradients. By employing skip connections to propagate information over layers ResNet 50 permits use of deeper networks. Skip connections help the network to understand global features, and thereby enhances the detection of smaller objects in an image.

A forward pass is run on each of the three images 102 for every triplet 114, employing the loop where a triplet 114 is selected at 122, a test is performed at 123 to determine if all triplets 114 have been processed, a counter i, is initialized at 124, an image document 102 of a selected triplet 114 is selected at 125 and the selected image document 102 is provided to the neural network 118 which produces an n-dimensional embedding 119 for the selected image document 102 of the selected triplet 114. The value of the counter i is checked at 126 to determine if each image 102 of the selected triplet 114 has been processed by the neural network 118 to generate an n-dimensional embedding 119. If i is less than or equal to the value of three at 126, then the counter i is incremented at 127, the next document image 102 in the selected triplet 114 is selected as a function of the counter i and the selected document image 102 is provided to the neural network 118. This process is repeated again for the third image document 102 in the selected triplet 114.

The 3, n-dimensional embeddings 119 are fed to a contrastive loss function 120 that forces similar images 102 to have small L2 distances and dissimilar embeddings to have large L2 distances. In one embodiment, the contrastive loss function 120 may take a form as described in "FaceNet: A Unified Embedding for Face Recognition and Clustering," by F. Schroff, D. Kalenichenko, J. Philbin, arXiv: 1503.03832 (2015). The contrastive loss function 120 can be optimized using any form of stochastic gradient descent and the gradients are backpropagated though the shared weights of the CNN 118. Once all triplets are processed, as determined by the test at 123, additional iterations may be performed to permit further convergence of the neural network 118. After some iterations, the network 118 is considered trained, at which point the weights of the network 118 are frozen and the network can be used for inference. The threshold at which the network 118 is considered sufficiently trained to generate trained network 130 is preferably changeable and may generally be determined when the feedback provided by the contrastive loss function 120 results in a decrease in a change in the learning by neural network 118. This may be determined manually or by a learning threshold value that is computed as a function of change in values produced by the neural network 118 as a function of time. The trained network 130 operates by performing inference functions 132 to process production image documents 134.

The neural network 118 is trained to look at 3 images 102 at a time. It has a loss function that aims to minimize L2 distance between similar images 102 and maximize L2 distance between dissimilar images 102. Each image 102 is processed by the neural network 118 to have an n-dimensional embedding that represents the image (i.e., a vector representation of the image). The feedback from the contrastive loss function 120 to the neural network 118 operates to adjust the vector so the L2 distance is small between similar images 102 and large between dissimilar images 102. In certain embodiments, the foregoing adjustments to decrease the L2 distance between similar images 102 and to increase the L2 distance between dissimilar images 102 may be performed concurrently.

The embeddings 119 generated by a forward pass on the neural network 118 can be used for clustering or retrieval, as seen in further detail in FIG. 8. For clustering, as noted above, the L2 distance may be used as the distance function in an implementation of DBSCAN or any other unsupervised clustering algorithm based on vector distance. For retrieval, production documents 134 that share the same layout as an instance document can be retuned using the L2 distance between their precomputed embeddings. In this scheme, a query document is presented to the system and the embedding is calculated by the inference engine 132. L2 distance is then used to compare the embedding from the query document to each embedding in a database of images and their embeddings are also calculated by inference engine 132, in accordance with the following formula of n-dimensional L2 distance, also known as Euclidean distance:

$$d(p, q) = \sqrt{(p_1 - q_1)^2 + (p_2 - q_2)^2 + \ldots + (p_i - q_i)^2 + \ldots + (p_n - q_n)^2}$$

As seen in FIG. 8, trained network 130 performs deep neural network inference 132 on production image documents 134. The deep neural network inference 132 generates an embedding vector 802 of an image 134. The embedding vectors 802 are stored in a document image vector database 804. A triplet 114 of image vectors 802 is retrieved from the database 804 and distances between the image vectors in the triplet is computed by distance calculator 805 to generate distances 806. Ranking module 808 employs the distances 806 to annotate image documents 134 with ranking information such that the list is ranked in order of most structurally similar to the input query document image. Clustering module 810 uses the pairwise distance calculation to group similar layouts together. In one embodiment DBSCAN may be used.

Figure 9:
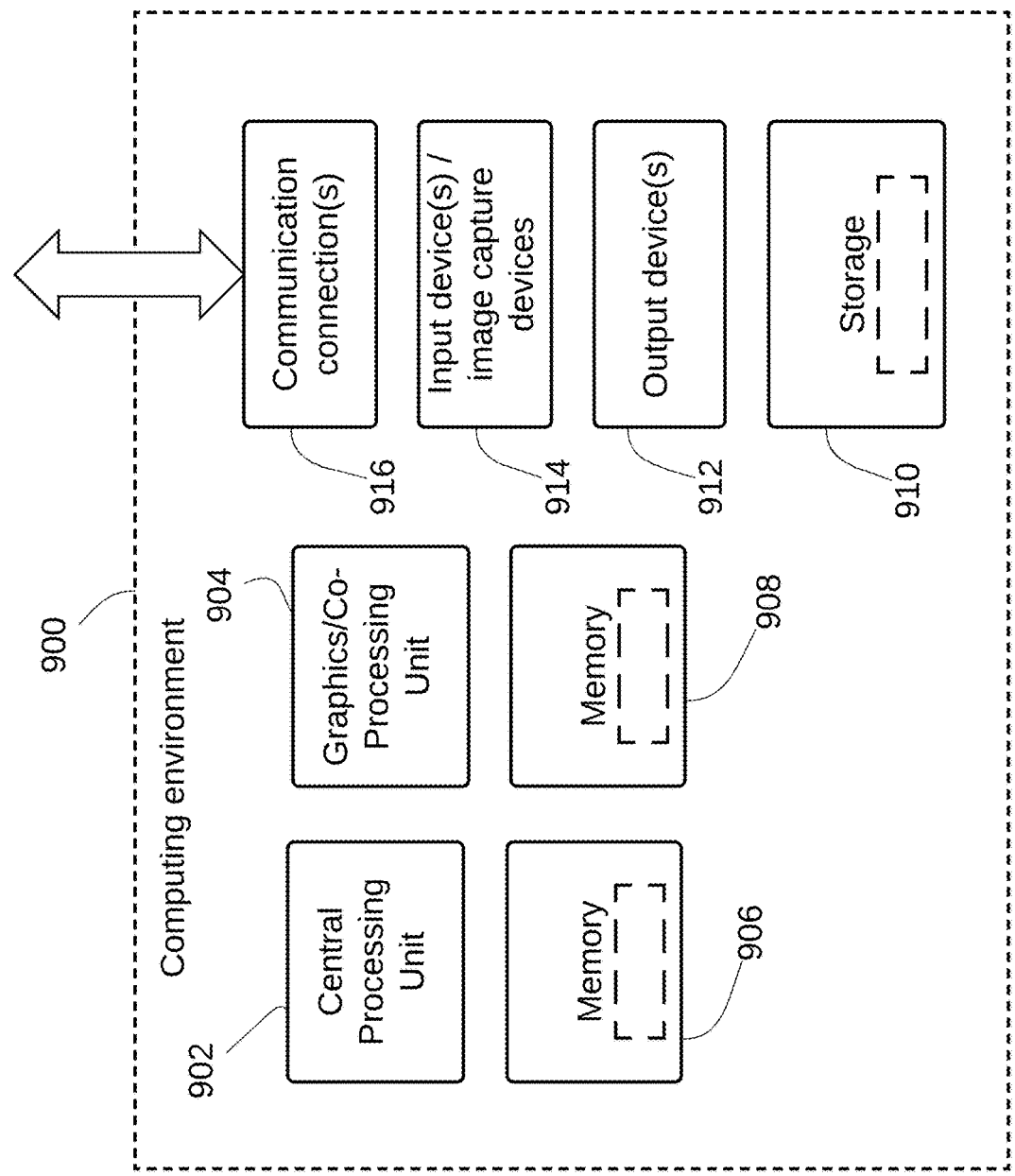
FIG. 9 illustrates a block diagram of hardware that may be employed in an implementation of the system 100.

FIG. 9 depicts a generalized example of a suitable general-purpose computing system 900 in which the described innovations may be implemented in order to improve the processing speed and efficiency with which the computing system 900 operates to perform the functions disclosed herein. With reference to FIG. 9, the computing system 900 includes one or more processing units 902, 904 and memory 906, 908. The processing units 902, 906 execute computer-executable instructions. A processing unit can be a general-purpose central processing unit (CPU), processor in an application-specific integrated circuit (ASIC) or any other type of processor. The tangible memory 906, 908 may be volatile memory (e.g., registers, cache, RAM), non-volatile memory (e.g., ROM, EEPROM, flash memory, etc.), or some combination of the two, accessible by the processing unit(s). The hardware components in FIG. 9 may be standard hardware components, or alternatively, some embodiments may employ specialized hardware components to further increase the operating efficiency and speed with which the system 100 operates. The various components of computer system 900 may be rearranged in various embodiments, and some embodiments may not require nor include all of the above components, while other embodiments may include additional components, such as specialized processors and additional memory.

Computing system 900 may have additional features such as for example, storage 910, one or more input devices 914, one or more output devices 912, and one or more communication connections 916. An interconnection mechanism (not shown) such as a bus, controller, or network interconnects the components of the computing system 900. Typically, operating system software (not shown) provides an operating system for other software executing in the computing system 900, and coordinates activities of the components of the computing system 900.

The tangible storage 910 may be removable or non-removable, and includes magnetic disks, magnetic tapes or cassettes, CD-ROMs, DVDs, nonvolatile random-access memory, or any other medium which can be used to store information in a non-transitory way and which can be accessed within the computing system 900. The storage 910 stores instructions for the software implementing one or more innovations described herein.

The input device(s) 914 may be a touch input device such as a keyboard, mouse, pen, or trackball, a voice input device, a scanning device, or another device that provides input to the computing system 900. For video encoding, the input device(s) 914 may be a camera, video card, TV tuner card, or similar device that accepts video input in analog or digital form, or a CD-ROM or CD-RW that reads video samples into the computing system 900. The output device(s) 912 may be a display, printer, speaker, CD-writer, or another device that provides output from the computing system 900.

The communication connection(s) 916 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules, which may be stored in tangible storage 910, may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The terms "system" and "computing device" are used interchangeably herein. Unless the context clearly indicates otherwise, neither term implies any limitation on a type of computing system or computing device. Collectively, the components shown for computing system 900 are intended to represent a broad category of hardware systems, including but not limited to general purpose computer systems and specialized handheld computer devices. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method for generating groupings of documents that are in image format, where the image format has a visually perceptible geometric structure and a plurality of visually perceptible key-value pairs, the method comprising:

assigning each image document of a plurality of image documents to a layout group wherein all documents in a particular layout group share a visually perceptible layout that is similar, and share a similar set of visually perceptible key-value pairs where a key in each key-value pair identifies a value associated with that key-value pair, and share a similar visually perceptible structure;

forming a plurality of triplets by selecting two image documents from a first layout group and a third image document from a second layout group;

for each triplet, processing each image document in a triplet with a convolutional neural network (CNN) to generate an n-dimensional embedding for each image document in the triplet, wherein the n-dimensional embedding represents a compressed representation of the image document, and wherein two identical image documents have the same n-dimensional embedding;

processing each image document in each triplet with a contrastive loss module to identify differences between the image documents in the triplet; and repeating processing of each image document with the CNN and the contrastive loss module to minimize a Euclidian distance in the n-dimensional embeddings of documents in a triplet selected from the same layout group and to maximize the Euclidean distance in the n-dimensional embeddings of documents in a triplet selected from different groups.

2. The computerized method of claim 1 further comprising:

processing each of the image documents to generate, for each of the image documents, a corresponding textually encoded document wherein visual representations of text in an image document of the image documents are converted to a textual encoding in the corresponding textually encoded document, the processing of each of the image documents further comprising one or more of the following operations: speckle noise removal, orientation correction, skew correction, contrast enhancement, binarization, and background removal.

3. The computerized method of claim 2 further comprising
assigning each of the corresponding textually encoded documents, into one of a plurality of layout groups, wherein all textually encoded documents in a particular layout group share a visually perceptible layout that is similar, and share a similar set of visually perceptible key-value pairs where a key in each key-value pair identifies a value associated with that key-value pair, and share a similar visually perceptible structure;
wherein assigning each of the textually encoded documents, into one of a plurality of layout groups, comprises using locally connected subgraph isomorphism and density-based spatial clustering of applications with noise.

4. The computerized method of claim 1 wherein for each triplet, processing each image document in a triplet with the CNN to generate an n-dimensional embedding for each image document in the triplet, wherein the n-dimensional embedding represents a compressed representation of the image document, and wherein two identical image documents have the same n-dimensional embedding, comprises:
comparing each image document in a triplet to each other and minimizing a Euclidean distance between image documents in the triplet belonging to the same layout group and maximizing the Euclidean distance between image documents in the triplet belonging to different layout groups.

5. The computerized method of claim 4 wherein processing each image document in each triplet with a contrastive loss module to identify differences between the image documents in the triplet, comprises providing feedback to the CNN to permit the CNN to minimize the Euclidean distance between image documents in the triplet belonging to the same layout group and maximize the Euclidean distance between image documents in the triplet belonging to different layout groups.

6. The computerized method of claim 1 wherein repeating the processing with the CNN and the contrastive loss function a number of times to generate a trained network, comprises:
repeating the processing with the CNN and the contrastive loss function until feedback by the contrastive loss module results in a decrease in a change in learning by the CNN.

7. The computerized method of claim 6 wherein repeating the processing with the CNN and the contrastive loss function until feedback by the contrastive loss module results in a decrease in a change in learning by the CNN, comprises:
determining an amount of change in learning by the CNN;
comparing the amount of change in learning by the CNN to a learning threshold value; and
repeating the processing with the CNN and the contrastive loss function until the amount of change in learning by the CNN is below the learning threshold value.

8. A document processing system comprising:
data storage for storing image documents that are in image format, where the image format has a visually perceptible geometric structure and a plurality of visually perceptible key-value pairs; and
a processor operatively coupled to the data storage and configured to execute instructions that when executed cause the processor to:
generate, for each image document of the image documents, a corresponding textually encoded document wherein visual representations of text in each image document are converted to a textual encoding in the corresponding textually encoded document;
assign each of the corresponding textually encoded documents, into one of a plurality of layout groups, wherein all textually encoded documents in a particular layout group share a visually perceptible layout that is similar, and share a similar set of visually perceptible key-value pairs where a key in each key-value pair identifies a value associated with that key-value pair, and share a similar visually perceptible structure;
assign each image document of the image documents to a layout group assigned to the corresponding textually encoded document;
form a plurality of triplets by selecting two image documents from a first layout group and a third image document from a second layout group;
for each triplet, process each image document in a triplet with a convolutional neural network (CNN) to generate an n-dimensional embedding for each image document in the triplet, wherein the n-dimensional embedding represents a compressed representation of the image document, and wherein two identical image documents have the same n-dimensional embedding;
process each image document in each triplet with a contrastive loss module to identify differences between the image documents in the triplet;
repeat processing of each image document with the CNN and the contrastive loss module a number of times to generate a trained network; and
employ the trained network to process a production set of image documents to generate groupings of the production set of image document.

9. The document processing system of claim 8 wherein the instructions that when executed cause the processor to process each of the image documents to generate, for each of the image documents, a corresponding textually encoded document wherein visual representations of text in an image document are converted to a textual encoding in the corresponding textually encoded document further comprise one or more of the following operations: speckle noise removal, orientation correction, skew correction, contrast enhancement, binarization, and background removal.

10. The document processing system of claim 8 wherein the instructions that when executed cause the processor to assign each of the textually encoded documents, into one of a plurality of layout groups, comprises using locally connected subgraph isomorphism and density-based spatial clustering of applications with noise.

11. The document processing system of claim 8 wherein the instructions that when executed cause the processor to, for each triplet, process each image document in a triplet with the CNN to generate an n-dimensional embedding for each image document in the triplet, wherein the n-dimensional embedding represents a compressed representation of the image document, and wherein two identical image documents have the same n-dimensional embedding, comprise instructions that cause processor to:
compare each image document in a triplet to each other and minimize a Euclidean distance between image documents in the triplet belonging to the same layout group and maximize the Euclidean distance between image documents in the triplet belonging to different layout groups.

12. The document processing system of claim 11 wherein the instructions that when executed cause the processor to process each image document in each triplet with a contrastive loss module to identify differences between the image documents in the triplet, comprise instructions that cause the processor to provide feedback to the CNN to permit the CNN to minimize the Euclidean distance between image documents in the triplet belonging to the same layout group and maximize the Euclidean distance between image documents in the triplet belonging to different layout groups.

13. The document processing system of claim 8 wherein the instructions that when executed cause the processor to repeat the processing with CNN and the contrastive loss function a number of times to generate a trained network, comprise instructions that cause the processor to:
repeat processing with the CNN and the contrastive loss function until feedback by the contrastive loss module results in a decrease in a change in learning by the CNN.

14. The document processing system of claim 13 wherein the instructions that when executed cause the processor to repeat the processing with the CNN and the contrastive loss function until feedback by the contrastive loss module results in a decrease in a change in learning by the CNN, comprise instructions that cause the processor to:
determine an amount of change in learning by the CNN;
compare the amount of change in learning by the CNN to a learning threshold value; and
repeat the processing with the CNN and the contrastive loss function until the amount of change in learning by the CNN is below the learning threshold value.

15. The computerized method of claim processing system of claim 8 wherein the operation of, for each triplet, processing each image document in a triplet with the CNN to generate an n-dimensional embedding for each image document in the triplet, wherein the n-dimensional embedding represents a compressed representation of the image document, and wherein two identical image documents have the same n-dimensional embedding, comprises:
comparing each image document in a triplet to each other and minimize a Euclidean distance between image documents in the triplet belonging to the same layout group and maximizing the Euclidean distance between image documents in the triplet belonging to different layout groups.

16. A computerized method for generating groupings of documents that are in image format, where the image format has a visually perceptible geometric structure and a plurality of visually perceptible key-value pairs, the method comprising:
selecting from a set of image documents, three documents to form a plurality of triplets by selecting two image documents from a first layout group and a third image document from a second layout group, wherein a first image document in the first layout group represents an anchor image, a second document in the first layout group represents an image similar to the anchor image and the third image document from the second layout group represents an image dissimilar to the anchor image;
for each triplet, processing each image document in a triplet with a convolutional neural network (CNN) to generate an n-dimensional embedding for each image document in the triplet, wherein the n-dimensional embedding represents a compressed representation of the image document, and wherein two identical image documents have the same n-dimensional embedding;
processing each image document in each triplet with a contrastive loss module to identify differences between the image documents in the triplet; and
repeating processing of each image document with the CNN and the contrastive loss module to minimize a Euclidian distance in the n-dimensional embeddings of documents in a triplet selected from the same layout group and to maximize the Euclidean distance in the n-dimensional embeddings of documents in a triplet selected from different groups.

17. The computerized method of claim 16 further comprising:
processing each of the image documents to generate, for each of the image documents, a corresponding textually encoded document wherein visual representations of text in an image document of the image documents are converted to a textual encoding in the corresponding textually encoded document, the processing of each of the image documents further comprising one or more of the following operations: speckle noise removal, orientation correction, skew correction, contrast enhancement, binarization, and background removal.

18. The computerized method of claim 17 further comprising
assigning each of the corresponding textually encoded documents, into one of a plurality of layout groups, wherein all textually encoded documents in a particular layout group share a visually perceptible layout that is similar, and share a similar set of visually perceptible key-value pairs where a key in each key-value pair identifies a value associated with that key-value pair, and share a similar visually perceptible structure;
wherein assigning each of the textually encoded documents, into one of a plurality of layout groups, comprises using locally connected subgraph isomorphism and density-based spatial clustering of applications with noise.

19. The computerized method of claim 16 wherein repeating processing of each image document with the CNN and the contrastive loss module to minimize a Euclidian distance in the n-dimensional embeddings of documents in a triplet selected from the same layout group and to maximize the Euclidean distance in the n-dimensional embeddings of documents in a triplet selected from different groups comprises repeating the processing with the CNN and the contrastive loss module until feedback by the contrastive loss module results in a decrease in a change in learning by the CNN.

20. The computerized method of claim 19 wherein repeating the processing with the CNN and the contrastive loss module until feedback by the contrastive loss module results in a decrease in a change in learning by the CNN, comprises:
determining an amount of change in learning by the CNN;
comparing the amount of change in learning by the CNN to a learning threshold value; and
repeating the processing with the CNN and the contrastive loss module until the amount of change in learning by the CNN is below the learning threshold value.

* * * * *